United States Patent Office 3,801,656
Patented Apr. 2, 1974

3,801,656
CATALYTIC HYDRATION OF OLEFINS
Orville D. Frampton, Wyoming, and Julian Feldman, Cincinnati, Ohio, assignors to National Distillers and Chemical Corporation, New York, N.Y.
No Drawing. Continuation of abandoned application Ser. No. 685,322, Nov. 24, 1967. This application Sept. 30, 1971, Ser. No. 185,425
Int. Cl. C07c 29/04
U.S. Cl. 260—641                                 8 Claims

ABSTRACT OF THE DISCLOSURE

Ethanol is prepared by contacting ethylene and liquid water or an aqueous solution of an inert solvent with a catalytic amount of a prereduced catalyst consisting of molybdenum oxide on a zirconia support at 250°–350° C., 750–5000 p.s.i., and a mole ratio of water to ethylene of 1:5 to 25:1.

---

This application is a continuation of application Ser. No. 685,322, filed Nov. 24, 1967 and now abandoned.

This invention relates to the liquid phase hydration of ethylene to produce ethanol. More particularly, this invention is concerned with an improved method for the hydration of ethylene in the presence of a novel catalyst.

It has previously been suggested in U.S. Pat. No. 2,995,609 that the catalytic hydration of olefins may be accomplished by the use of certain molybdenum oxide catalysts. Moreover, the use of certain catalysts containing molybdenum oxide in combination with a composite of silica and an oxide of at least one metal of Group IIIb and IVa of the Periodic Table, e.g., alumina, zirconia, hafnia, titania and thoria, for the vapor phase catalytic hydration of olefins has been previously disclosed in U.S. Pat. No. 3,076,036. Although the latter catalysts were found to be employable in the vapor phase hydration of olefins of from three to five carbon atoms, they were found to be inoperable in the hydration of ethylene to ethanol.

One object of this invention is to provide an improved method for the catalytic hydration of ethylene to ethanol.

Another object of this invention is to provide a novel catalyst for the liquid phase hydration of ethylene to ethanol.

These and other objects of the invention will be apparent from the ensuing description and illustrative embodiments.

In general, the method of the invention provides for hydration of ethylene by contacting a mixture of the ethylene and liquid water or an aqueous solution of an inert solvent to a prereduced hydration catalyst containing molybdenum oxide on a zirconia support at elevated temperature under sufficient pressure to maintain an aqueous liquid phase thereby converting the ethylene to ethanol.

The olefin hydration catalyst of this invention may be prepared by impregnating a hydrous zirconia of the formula $ZrO_2 \cdot xH_2O$, wherein $x$ is an integer of from 1 to 100, with a solution of a molybdenum-containing compound, and thereafter drying, calcining and reducing the resultant mixture. The hydrous zirconia must be free of salts of sodium, potassium and lithium. It may be prepared from a zirconium tetrahalide, for example, zirconium tetrachloride, by the addition of aqueous ammonia to form the hydrous zirconia. The resulting ammonium halide, e.g. ammonium chloride, is then washed out and the resultant product is dried at about 120° C., and is then impregnated with a solution of a molybdenum-containing compound in a solvent.

Among the molybdenum-containing compounds that may be employed in the practice of this invention are such compounds as phosphomolybdic acid, silicomolybdic acid or the ammonium salts thereof, ammonium molybdate, zircono-12-molybdic acid and the ammonium salts thereof, and other like compounds. The solvent which may be employed in this procedure must be one in which the molybdenum compound is soluble and includes such solvents as water, ether or other suitable solvents.

The impregnated preparation is dried and calcined in air at a temperature of about 400°–450° C., to convert the molybdenum compound to molybdic oxide. Alternatively, the washed hydrous zirconia may be calcined before impregnation with the molybdenum compounds. The resulting molybdic oxide on zirconia product is then activated by reducing the molybdic oxide to molybdenum suboxide by heating with a reducing agent, for example, hydrogen or alcohol, to a temperature sufficiently high to cause reduction, such as at 350°–500° C., to yield the improved catalyst of this invention.

In the preferred embodiment of the invention, the reduced catalyst is contained in a fixed bed in the form of pellets or extrudates where it can act on a mixture of ethylene and aqueous liquid which is caused to flow continuously through the bed. The system is held at a temperature sufficiently high to achieve activity in the catalyst and a pressure sufficiently high to maintain aqueous liquid phase and adequate ethylene solubility. The product mixture taken from the reactor is condensed, and the unreacted ethylene together with ether is flashed off and recycled. Ethanol is recovered from the condensed aqueous product by distillation. If desired, the distilled ethanol product or the liquid phase from the reactor may be separated under process conditions of temperature and pressure, and then contacted with a hydrogenation catalyst and hydrogen in vapor or liquid phase to convert catalytically the by-products containing olefinic and/or carbonyl functions, such as crotonaldehyde, acetaldehyde, or the like, to saturated alcohols easily separable, e.g. by distillation. It is also possible to contact the reactants as a slurry with powdered hydration catalyst with the catalyst being retained in the reactor by means of a filter.

The hydration catalysts utilized herein consist essentially of about 15 to 35 percent molybdenum oxide on a zirconia support which constitutes the remainder of the catalyst. Preferably, the composition contains about 20 percent of the molybdic oxide and 80 percent zirconia.

The catalyst must be free of salts of alkali metals since these act as hydration catalyst poisons. The catalyst is prereduced, preferably with hydrogen at a temperature of about 350°–500° C. Alcohol vapor, e.g., ethanol, isopropanol, butanol, or the like can also be effectively used to prereduce the catalyst.

Conditions of hydration should be such that there is always present a liquid phase into which water, olefin and alcohol can dissolve. The liquid phase can be either water or an aqueous solution of an inert, relatively non-volatile or, where volatile, easily separable by distillation, liquid solvent. Various ketones, aldehydes, alcohols, nitriles, esters, amides, amino alcohols, phenols, triols, polyols, alcohol ethers, amines, and organic acids may be employed as inert solvents. Examples of suitable solvents include ethylene glycol, hexylene glycol (2-methyl-2,4-pentane diol), dipropylene glycol, tetraethylene glycol, propylene glycol, ethylene diamine, glyoxal, isopropyl alcohol, methyl cellosolve, morpholine, triethanolamine, acetone, acetic acid, formic acid, tert- butyl alcohol, acetonitrile, methyl ethyl ketone, ethyl acetate, and ethanol itself. Such a solvent achieves a higher solubility of the ethylene compared to water and at the same time dissolves the ethanol and by-product ether. These factors increase hydration rate, allow for use of lower pressures, and drive the hydration to high ethylene, conversions.

After the product alcohol has been separated from it, the selected solvent can be recycled. When ethanol itself is the selected solvent, only that amount of alcohol synthesized is taken as product and the remainder recycled.

Catalytic hydration with the above catalysts may be conducted over a wide range of conditions. Usually the temperature employed is within the range of about 250°–350° C., with a preferred range of about 290°–310° C. The pressure should be within the range of 750 to 5000 p.s.i. and preferably should be between 3500 and 4500 p.s.i. The mole ratio of water to ethylene is generally within the range of 1:5 to 25:1, and preferably it is within the range of 8:1 to 15:1.

This invention provides a novel non-corrosive, water-insoluble, heterogeneous catalyst for the liquid phase hydration of ethylene to ethanol under certain controlled operating conditions.

The following examples will serve to illustrate the process of the invention:

EXAMPLE I (A) A molybdenum oxide on zirconia catalyst was prepared by impregnating an aqueous solution of phosphomolybdic acid on hydrous zirconia. The latter was prepared by the addition of a stoichiometric amount of ammonium hydroxide to zirconium tetrachloride to form a hydrous zirconia gel and ammonium chloride, then washing the gel free of ammonium chloride with water. After impregnation, the hydrous zirconia was dried, then calcined to give molybdenum oxide (calculated as 18% phosphomolybdic acid) on zirconia. The catalyst was pelleted, then activated by reducing it in a flowing stream of hydrogen at 426°–496° C., for 13 hours.

(B) 100 milliliters (157 grams) of the reduced catalyst from part A above, were placed in a 150 ml. ¾ inch inside diameter jacketed pressure reactor equipped with thermocouple probes extending into the catalyst bed. Ethylene gas and liquid oxygen-free water were pumped continuously at 3800 p.s.i. into the heated reactor through entry ports at the bottom of the reactor; the mole ratio of water to ethylene being 14:1, and the water flow rate being 1.2 ml. per ml. catalyst per hour. The liquid-gas mixture continuously passed up through the catalyst bed at 290° C., during which time the hydration reaction occurred. The reaction product mixture was continuously removed from the reactor through an exit port at the top, was cooled, then passed through a pressure regulator wherein the pressure on the product was dropped from 3800 p.s.i. to atmospheric pressure. The liquid product was collected, the vapor product was condensed and collected in a receiver at −78° C., and non-condensable gas, principally unreacted ethylene, was passed through a wet test meter for measurement, then vented.

The hydration reaction was allowed to proceed 6.4 hours after which time gas-liquid chromatographic analyses were made of the products. The ethanol concentration was found to be 0.6% and calculations showed the space time yield to be 0.007 gram alcohol per ml. catalyst per hour. The conversions of ethylene were found to be 3% to ethanol and .03% to polymer. The mass balance was 100%.

EXAMPLE II

The same molybdenum oxide on zirconia catalyst and procedure from Example I, part B, was used except that the reaction temperature was 314° C., the mole ratio of water to ethylene was 7.6:1, the liquid water pumping rate was 0.7 ml. water per ml. catalyst per hour, and the pressure was 3900 p.s.i. The hydration proceeded 9.9 hours at which time the ethanol concentration in the liquid product was found to be 0.9%. The space time yield of ethanol was .006 grams ethanol per ml. catalyst per hour. The conversions of ethylene were 2.8% to ethanol and .2% to polymer.

While particular embodiments of this invention are shown above, it will be understood that the invention is obviously subject to variations and modifications without departing from its broader aspects.

What is claimed is:

1. A liquid phase process for converting ethylene to ethanol which consists essentially of contacting said ethylene and liquid water or an aqueous solution of an inert solvent with a prereduced catalyst at a temperature within the range of about 250°–350° C., a pressure within the range of about 750–5,000 p.s.i., and a mole ratio of water to ethylene within the ratio of about 1:5–25:1, wherein said prereduced catalyst consists of about 65%–85% zirconia support, free of alkali metal ions, and the remainder, molybdenum suboxide obtained by drying and calcining in air at about 400°–450° C. a material selected from the group consisting of phosphomolybdic acid, silicomolybdic acid and the ammonium salts thereof, ammonium molybdate, zircono-12-molybdic acid and the ammonium salts thereof to give molybdic oxide and reducing said molybdic oxide at about 350°–500° C. with hydrogen or alcohol.

2. The process of claim 1 wherein the catalyst contains 20 percent of molybdenum oxide, and 80 percent of zirconia.

3. The process of claim 1 wherein the catalyst is prereduced with hydrogen gas at a temperature within the range of about 350°–500° C.

4. The process of claim 1 wherein the temperature is within the range of about 290°–310° C., and the pressure is within the range of about 3500 to 4500 p.s.i.

5. The process of claim 1 wherein the mole ratio of water to olefin is within the range of about 8:1 to 15:1.

6. The process of claim 1 wherein the inert solvent is ethanol.

7. The process of claim 1 wherein the catalyst is placed in a fixed bed in the form of pellets or extrudates and the mixture of ethylene and liquid water flows continuously through said bed.

8. A liquid phase process for converting ethylene to ethanol which consists essentially of contacting said ethylene in the presence of liquid water, wherein the mole ratio of water to ethylene is within the range of about 8:1–15:1, with a prereduced catalyst at a temperature within the range of about 290°–310° C., and a pressure within the range of about 3500–4500 p.s.i., said prereduced catalyst consisting of a 20% molybdenum suboxide obtained by drying and calcining in air at about 400°–450° C. a material selected from the group consisting of phosphomolybdic acid, silicomolybdic acid and the ammonium salts thereof, ammonium molybdate, zircono-12-molybdic acid and the ammonium salts thereof to give molybdic oxide and reducing said molybdic oxide with hydrogen gas at a temperature within the range of about 350°–500° C., on an 80% zirconia support, free of alkali metal ions.

References Cited

UNITED STATES PATENTS

| 3,006,970 | 10/1961 | Beuther et al. | 260—641 |
| 2,780,617 | 2/1957 | Zletz | 252—469 |
| 3,285,977 | 11/1966 | Henke et al. | 260—641 |
| 2,995,609 | 8/1961 | Frech et al. | 260—641 |
| 2,519,061 | 8/1950 | Mason | 260—641 |
| 2,755,309 | 7/1956 | Reynolds et al. | 260—641 |
| 2,663,744 | 12/1953 | Lukasiewicz et al. | 260—641 |

OTHER REFERENCES

Evans et al: "Ind. & Eng. Chem.," vol. 28 (1936), pp. 1186–8.

JOSEPH E. EVANS, Primary Examiner

U.S. Cl. X.R.

260—469, 643 B